US006225781B1

(12) United States Patent
Okamura et al.

(10) Patent No.: US 6,225,781 B1
(45) Date of Patent: May 1, 2001

(54) SYSTEM FOR CHARGING CAPACITORS CONNECTED IN SERIES

(75) Inventors: Michio Okamura; Masahiko Shinozuka, both of Kanagawa (JP)

(73) Assignees: JEOL Ltd., Tokyo; Kabushiki Kaisha Powersystem, Kanagawa, both of (JP)

( * ) Notice: Subject to any disclaimer, the term of this patent is extended or adjusted under 35 U.S.C. 154(b) by 0 days.

(21) Appl. No.: 09/440,947

(22) Filed: Nov. 16, 1999

Related U.S. Application Data

(63) Continuation-in-part of application No. 09/384,527, filed on Aug. 27, 1999, now Pat. No. 6,133,710.

(30) Foreign Application Priority Data

Aug. 27, 1998 (JP) .................................................. 10-241167
Nov. 16, 1998 (JP) .................................................. 10-324743

(51) Int. Cl.[7] .................................................. H01M 10/46
(52) U.S. Cl. ............................................ 320/122; 320/166
(58) Field of Search .................................... 320/116, 118, 320/120, 122, 166, 167, FOR 100, FOR 117

(56) References Cited

U.S. PATENT DOCUMENTS 5,528,121   6/1996   Okamura .
5,578,914 * 11/1996   Morita .
5,677,613 * 10/1997   Perelle .
5,969,505 * 10/1999   Okamura .

OTHER PUBLICATIONS

"A Basic Study on Power Storage Capacitor Systems", Michio Okamura, *Electrical Engineering in Japan*, vol. 116, No. 3, 1996, pp. 40–51.

* cited by examiner

*Primary Examiner*—Edward H. Tso
(74) *Attorney, Agent, or Firm*—Webb Ziesenheim Logsdon Orkin & Hanson, P.C.

(57) ABSTRACT

There is disclosed an electrical storage capacitor system that performs initializing charging and storage charging for energy storage with reduced energy loss. The capacitor system comprises capacitors connected in series, comparators for comparing the voltages developed across the capacitors with a first reference value, voltage limitation means connected in parallel with the capacitors to limit the voltages of the capacitors to a second reference value during initializing charging, and a charger. During initializing charging, the capacitors are charged while operating the voltage limitation means. Storage charging for energy storage is done according to the output signals from the comparators until the voltage of any one of the capacitors reaches the first reference value.

8 Claims, 7 Drawing Sheets

SYSTEM FOR CHARGING CAPACITORS CONNECTED IN SERIES

CROSS REFERENCE TO RELATED APPLICATION

This application is a continuation-in-part of U.S. patent application Ser. No. 09/384,527, filed Aug. 27, 1999 now U.S. Pat. No. 6,133,710.

FIELD OF THE INVENTION

The present invention relates an electrical storage capacitor system consisting of capacitors connected in series.

DESCRIPTION OF THE PRIOR ART

Where large-capacity capacitors are combined to constitute an electrical storage unit, if the capacitors are connected in series, uniform voltage must be assigned to the capacitors. We have already proposed an electrical storage system, referred to as an energy capacitor system (ECS), using electric double-layer capacitors. In this energy capacitor system, parallel monitors for monitoring and controlling voltages are connected in series with the capacitors. This permits maximum charging within the range of breakdown voltages of the capacitors.

Figure 8:
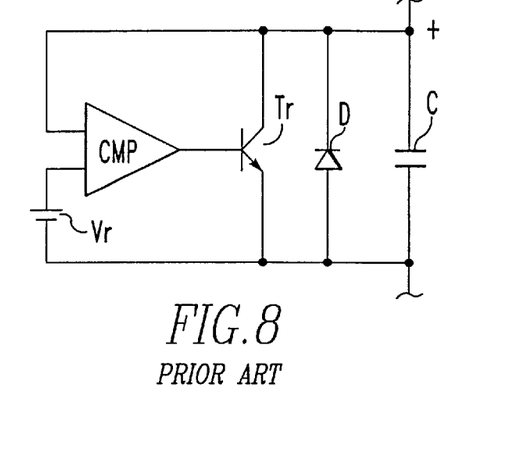
FIG. 8 is a circuit diagram of the prior art parallel monitor.
Figure 9:
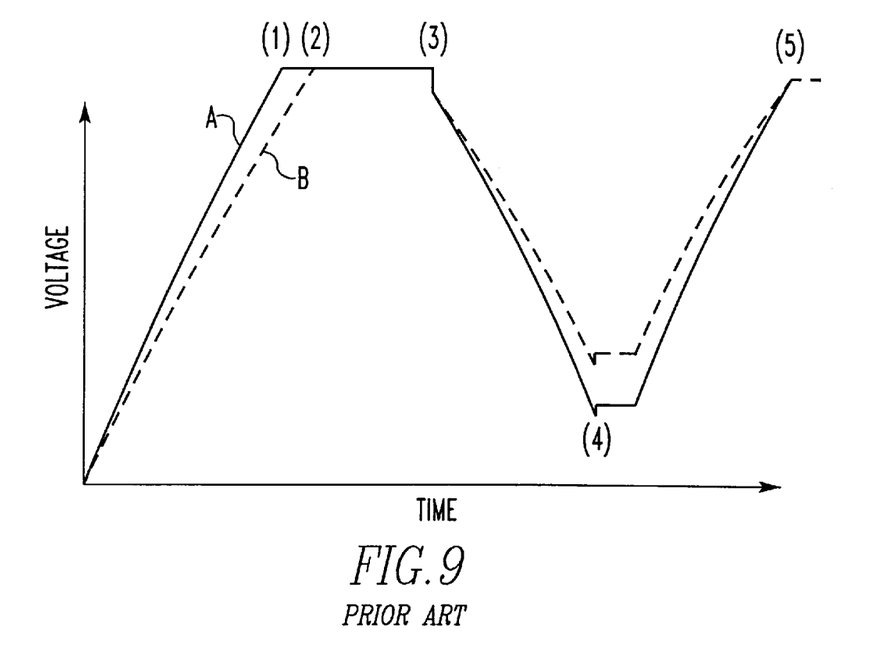
FIG. 9 is a graph illustrating the charging/discharging characteristics of the prior art parallel monitor shown in FIG. 8 when and after initializing charging is done.

FIG. 8 shows an example of the circuit configuration of such a parallel monitor. FIG. 9 is a graph illustrating the charging/discharging characteristics of the prior art circuit shown in FIG. 8 when and after the capacitor C is initialized.

In a parallel monitor, as shown in FIG. 8, a comparator CMP compares the voltage developed across a capacitor C with a reference voltage Vr. If this compared voltage reaches a set value determined by the reference voltage Vr, a transistor Tr is turned on, thus bypassing a charging current. As the charging operation progresses, the voltage developed across the capacitor C rises but is then kept at the set value as indicated by (1) in FIG. 9. With respect to other series connected capacitors having larger capacitances, the voltages rise with delays and reach full charge at point (2). After reaching full charge, relaxation charging is performed with a constant voltage until a next discharging (3) is commenced.

In this way, the prior art energy capacitor system (ECS) is initialized set such that the voltages developed across the capacitors become equal to the upper limit of voltage (full charge voltage) at point (1). Then, each capacitor is started to be charged and discharged from this initial condition.

The above-described structure is simple and economical to realize. Also, the operation is reliable. Therefore, this structure has played a great role in putting the energy capacitor system into practical use. However, during the period (1) to (2), the parallel monitor is turned on, and the charging current is bypassed. During this period, the charging energy is wasted as heat, thus constituting a problem. In particular, in the parallel monitor shown in FIG. 8, the transistor Tr is driven into conduction when the set voltage at (1) is reached. This forms a bypass circuit. The voltage is clamped to prevent the voltage from rising further. Therefore, the bypass circuit generates loss, or heat, corresponding to the "charging current×full charge voltage".

The heat generated during the period (1) to (2) is produced every charging/discharging cycle if the device is a secondary battery. On the other hand, a capacitor produces heat only once at the initializing. After the initializing, the terminal voltage of each capacitor varies downwardly from the set, full charge voltage, by discharging as indicated by (4). If charging is done after discharging, all the capacitors are almost simultaneously fully charged again with the original voltage (5) and so little bypass current flows. Strictly, the capacitors reach full charge with slight time differences because of slight characteristic variations and leakage currents during use. During the slight time differences, a bypass current flows. Consequently, some loss takes place after the initializing operation.

SUMMARY OF THE INVENTION

The present invention is intended to solve the problem of charging energy loss that would have been inevitably caused during initializing charging and during subsequent storage charging in the prior art technique.

It is an object of the present invention to provide an electrical storage capacitor system which is simple in structure and capable of reducing charging energy loss during initializing charging and during subsequent storage charging.

This object is achieved by an electrical storage capacitor system for charging capacitors connected in series, the capacitor system comprising voltage detection means, voltage-limiting means, initializing charging means, and storage charging means. The voltage detection means sense that the voltage developed across each capacitor has reached a first reference voltage. The voltage-limiting means limit the voltage developed across each capacitor to a second reference voltage. During initializing charging, the initializing charging means initially charges the capacitors connected in series while operating the voltage-limiting means. The storage charging means charge the capacitors connected in series to store energy. During the charging by the storage charging means, the full charging means perform charging until the outputs from the voltage detection means indicate that the voltage developed across any one capacitor reaches the first reference value.

In one feature of the invention, the first reference value can be the full charge voltage and the second reference value is set to be lower than the full charge voltage. The second reference value may be selected to be opposite in polarity to the full charge voltage.

Other objects and features of the invention will appear in the course of the description thereof, which follows.

BRIEF DESCRIPTION OF THE DRAWINGS

The preferred embodiments of the present invention are hereinafter described with reference to the accompanying drawings in which.

DESCRIPTION OF THE PREFERRED EMBODIMENTS

Figure 1:
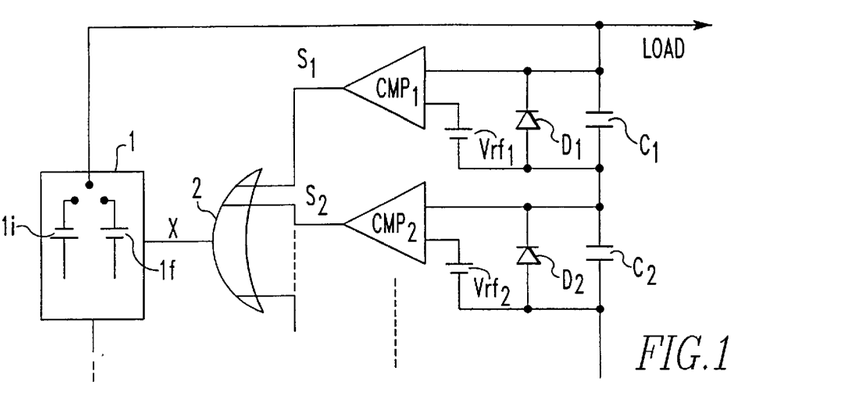
FIG. 1 is a circuit diagram of an electrical storage capacitor system in accordance with the present invention.

Referring to FIG. 1, electric double-layer capacitors $C_1$, $C_2$, etc. are connected in series to constitute an electrical storage system. A charger 1 charges the capacitors $C_1$, $C_2$, etc. connected in series, and can initially charge the capacitors $C_1$, $C_2$, etc. for setting them to their initialized state and storage charging the capacitors to store electrical energy. The charger 1 has a power supply if for storage charging and another power supply $1i$ for initializing charging. Both power supplies are current sources. One of the power supplies is selected at one time according to the purpose and connected with the capacitors. A single power supply can be used to serve for both power supplies $1f$ and $1i$.

Schottky diodes $D_1$, $D_2$, etc. are connected in parallel with the capacitors $C_1$, $C_2$, etc., respectively. These Schottky diodes form voltage-limiting means for limiting the voltages developed across the capacitors to a second reference value during initializing charging (described later).

Comparators $CMP_1$, $CMP_2$, etc. compare the voltages developed across the capacitors $C_1$, $C_2$, etc. with reference voltages $Vrf_1$, $Vrf_2$, etc., respectively, corresponding to full charge. If the voltages across the capacitors reach the reference voltages $Vrf_1$, $Vrf_2$, etc., the comparators produce output signals $S_1$, $S_2$, etc. indicating full charge. The comparators, including voltage sources for generating the reference voltages, constitute voltage detection means.

An OR circuit 2 ORs the output signals $S_1$, $S_2$, etc. from the comparators $CMP_1$, $CMP_2$, etc. When the capacitors $C_1$, $C_2$, etc. connected in series are being charged from a current source, if any one of them reaches full charge, the OR circuit 2 sends a control signal X to the charger 1 to switch the mode of operation to a constant-voltage charging mode at that voltage, i.e., relaxation charging mode. In practice, the plural capacitors are connected in series, the output signals $S_1$, $S_2$, etc. from the comparators $CMP_1$, $CMP_2$, etc., respectively, are sent to the OR circuit 2 via some kind of isolation circuit (e.g., photocouplers, pulse transformers, or current transfer circuits).

Initializing charging performed by the electrical storage capacitor system shown in FIG. 1 is next described. After the capacitors have been almost completely discharged, the charger 1 causes an electrical current to flow through the capacitors in a direction opposite to the direction used during the storage charging process, using the initializing charging power supply $1i$ (step 11 in FIG. 2). The capacitors are charged with the current from the power supply $1i$. It is assumed that each Schottky diode has a forward voltage of 0.3 V. If the charging process progresses and the voltage developed across one capacitor reaches −0.3 V, the charging current for the capacitor is bypassed by the Schottky diode.

Figure 2:
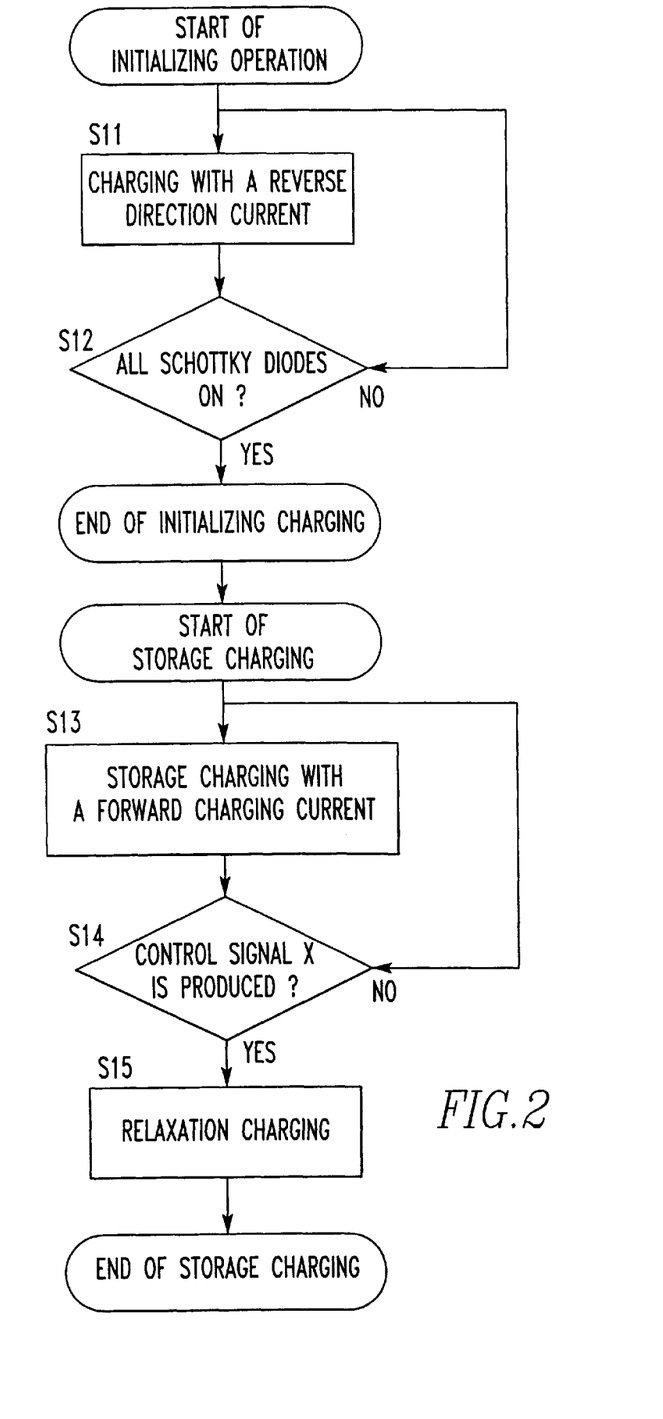
FIG. 2 is a flowchart illustrating a sequence of operations for initializing charging and storage charging the electrical storage capacitor shown in FIG. 1.

The result is that the voltage across the capacitor is limited to −0.3 V. A decision is made as to whether all Schottky diodes have been turned on (step 12). If the result is YES, i.e., the charging process has progressed and the Schottky diodes $D_1$, $D_2$, etc. of all the capacitors connected in series have been turned on, the charger 1 ends the initializing charging operation.

It is not always necessary in practice to sense that all Schottky diodes are turned on. For example, an initializing charging time in which all the Schottky diodes are turned on may be previously found. If this time elapses, the initializing charging operation may be immediately ended, using a timer.

The initializing charging operation is performed with a charging current flowing in the opposite direction to a charging current normally used. After the end of this initializing charging, the charger 1 performs storage charging operation using a forward charging current by making use of the storage charging power supply $1f$ (step 13). During the storage charging process, the comparators $CMP_1$, $CMP_2$, etc. are monitoring the voltages developed across the capacitors $C_1$, $C_2$, etc. When the capacitor voltages reach the reference voltages $Vrf_1$, $Vrf_2$, etc., i.e., full charge is reached, the comparators produce output signals $S_1$, $S_2$, etc. If any one comparator produces an output signal indicative of full charge, the OR circuit 2 sends the control signal X to the charger 1. A decision is made as to whether the control signal X is produced (step 14). If the result of the decision is YES, the mode of operation is switched to the constant-voltage charging mode at that capacitor voltage. As a result, relaxation charging is started (step 15).

Figure 3:
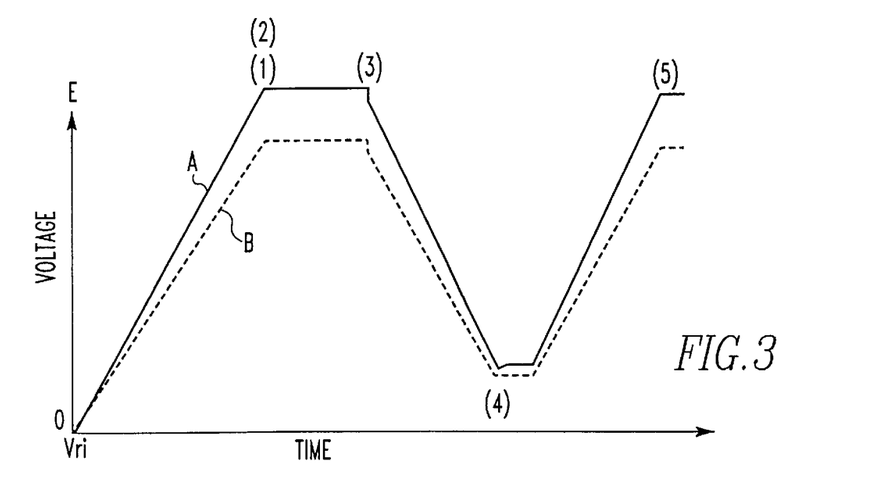
FIG. 3 is a graph illustrating the charging/discharging characteristics of the electrical storage capacitor shown in FIG. 1 when and after initializing charging is done.

Initializing charging, storage charging, and subsequent charging/discharging characteristics are next described by referring to FIG. 3. It is assumed that a capacitor A having a smaller capacitance and a capacitor B having a larger capacitance are connected in series. The voltages developed across the capacitors vary, as shown in FIG. 3. Initializing charging is completed by steps 11 and 12. When storage charging is started in step 13, it follows that the voltages developed across all the capacitors are made negative Vri by reverse charging. Where Schottky diodes are used, this voltage Vri is about −0.3 V. If storage charging is started from this with a forward current (step 13), the voltages developed across the capacitors A and B increase at rates in inverse proportion to their capacitances, as shown in FIG. 3. The capacitor having the smaller capacitance reaches full charge voltage earlier, and the control signal X is produced. The mode of operation is switched to constant-voltage charging (relaxation charging). Therefore, time differences (1)–(2), as encountered in the prior art system as already described in connection with FIG. 9, are not created. When the relaxation charging is started, the capacitor voltages are maintained at values in inverse proportion to their capacitances. Subsequent discharging/charging characteristics start at the voltage Vri at which the initializing charging was done, as shown in FIG. 3.

Comparison of the charging/discharging characteristics of the novel electrical storage capacitor system, as shown in FIG. 3, with the prior art characteristics shown in FIG. 9 shows that they differ in reference voltage of charging and discharging of capacitor. In FIG. 3, this reference voltage is a negative value of −0.3 V in the initialized condition. In the prior art structure shown in FIG. 9, the voltage is a full charge voltage. After the initializing charging, charging and discharging are started from the initialization voltage, similarly for both cases.

In the prior art method in which initializing charging is performed at full charge as illustrated in FIG. 9, all capacitors are charged to full charge voltage during initializing charging. Then, discharging is started. Therefore, the capacitor reaching full charge earliest continues consuming electric power given by "full charge voltage×charging current" until the final capacitor becomes full charge. On the other hand, in the present invention, during initializing charging, charging is done in such a way that all the capacitors assume an initial voltage lower than full charge voltage. Therefore, electric power consumption due to bypass current during initial setting operation is decreased by an amount proportional to the square of the ratio of full charge voltage to initializing voltage. For example, in the past, an initializing operation is performed at a full charge voltage of 3 V. In the embodiment of the present invention, an initializing operation is performed at −0.3 V. The electric power consumption in the present invention is smaller than the power consumption in the past by a factor of 100.

In the present invention, when storage charging is done after initializing operation, if a capacitor having a minimum capacitance and rising fastest in voltage becomes full charge first, the mode of operation is switched to constant-voltage charging. Therefore, no bypass current flows at all. As a consequence, in the present invention, no power loss occurs during storage charging.

In the embodiment described above, the voltage for initializing operation is set to −0.3 V. In the present invention, voltages (e.g., 0.5 V, 1 V, or 1.5 V) lower than the full charge voltage of 3 V, for example, can be used as the voltage for the initializing operation. If an initializing operation is performed at 1.5 V, the electric power consumption is smaller than that of the past by a factor of 4.

Figure 4:
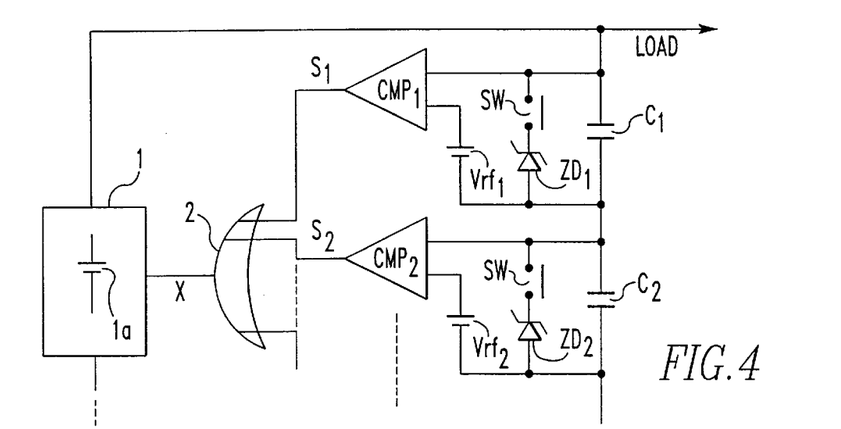
FIG. 4 is a circuit diagram of another electrical storage capacitor system in accordance with the present invention.

FIG. 4 is a diagram illustrating an electrical storage capacitor system in accordance with the present invention, and in which the voltage for the initializing operation has the same polarity as full charge voltage. This embodiment is similar to the embodiment described previously in connection with FIG. 1 except that the Schottky diodes are replaced by zener diodes $ZD_1$, $ZD_2$, etc. each equipped with a separating switch SW and that the initializing power supply 1$i$ is omitted from the charger 1.

In this embodiment, the zener voltage is set to 1.5 V, for example. The power supply if is used also as a current source for initializing operation. When initializing charging is performed, the switches SW are closed, and the initializing charging is started with a current from the power supply if. As the charging process progresses and the voltages developed across the capacitors reach the zener voltage in turn, the charging current is bypassed through the zener diodes. Therefore, the voltages across the capacitors are limited to the zener voltage of 1.5 V.

When the bypass current flows through the zener diodes $ZD_1$, $ZD_2$, etc. around all the capacitors connected in series and all the voltages across the capacitors reach the zener voltages, the charger 1 ends the initializing charging.

Immediately thereafter, the first storage charging operation is started. The storage charging is commenced after opening the switches SW to deactivate the zener diodes that are voltage-limiting means. This storage charging is carried out similarly to the storage charging in the embodiment described in connection with FIG. 1 except that the voltage at the beginning is 1.5 V.

Figure 10:
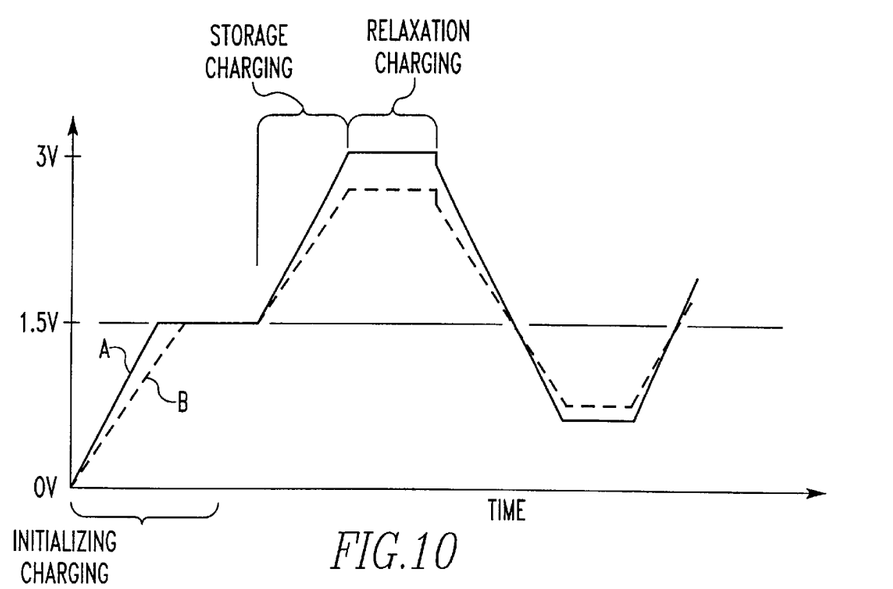
FIG. 10 is a graph illustrating the charging/discharging characteristics of the electrical storage capacitor system shown in FIG. 4 when and after initializing charging and storage charging are done.

FIG. 10 shows the initializing charging, storage charging, and subsequent charging/discharging characteristics of the electrical storage capacitor system shown in FIG. 4, similarly to FIG. 3. It can be seen from FIG. 10 that as a result of initializing charging, the voltages developed across the capacitors A and B having different capacitances are set equal to 1.5 V and that storage charging is performed from 1.5 V. The difference with the characteristics shown in FIG. 3 is that subsequent discharging and charging are performed at about 1.5 V.

Figure 11A:
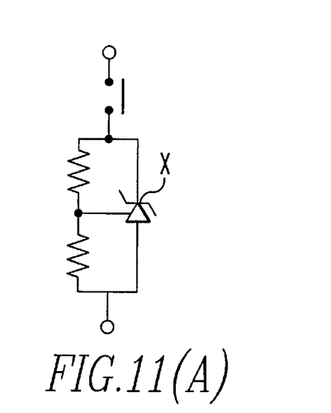
FIGS. 11(A)–11(C) are circuit diagrams of devices that can be used instead of zener diodes of the electrical storage capacitor system shown in FIG. 4.
Figure 11B:
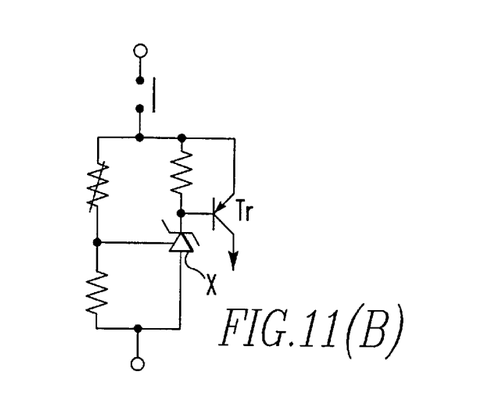

The zener diodes shown in the embodiment of FIG. 4 are represented as symbols simply having a voltage-limiting function. Other means can also be used if they have the same characteristics. For example, as shown in FIG. 11(A), a zener device X having a set value that can be varied by a resistor can be used. This zener device is an integrated circuit incorporating a reference voltage source and a comparator. As shown in FIG. 11(B), a circuit to which a transistor Tr is added to increase the current capacity can also be employed.

Figure 11C:
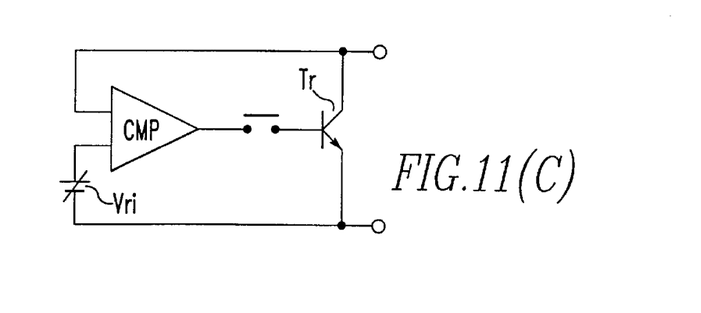

Furthermore, as shown in FIG. 11(C), discrete components consisting of a reference voltage source Vri, a comparator CMP, and a transistor Tr, respectively, are combined. This configuration can be used instead of the zener diode of the embodiment shown in FIG. 4.

Figure 5:
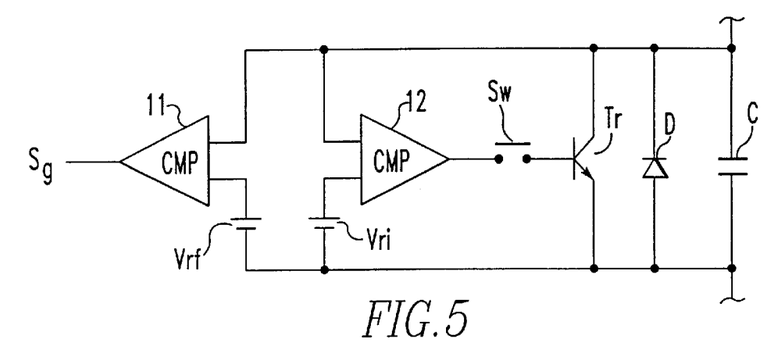
FIG. 5 is a circuit diagram of a further electrical storage capacitor system in accordance with the present invention.

FIG. 5 shows an example of electrical storage capacitor system using the configuration shown in FIG. 11(C). In FIG. 5, a comparator 12 compares the voltage developed across a capacitor C with an initialization voltage Vri. If the voltage across the capacitor C reaches the initialization voltage, the comparator produces an ON signal. A transistor Tr is connected so that it can bypass the charging current for the capacitor C. The ON signal is sent via a switch SW that is turned on during initializing charging. The transistor Tr is turned on according to the ON signal, thus bypassing the charging current. Consequently, the voltage developed across the capacitor C is limited to the initialization voltage.

This initializing charging can be ended, for example, by monitoring the output from the comparator 12 and sensing that all comparators 12 produce an ON signal that turns on the transistor Tr. Alternatively, the initializing charging may be ended by sensing that the total sum of the terminal voltages of the capacitors C connected in series reach "initialization voltage Vri×number of capacitors".

A circuit consisting of a full charge voltage source Vrf and the comparator 11 controls storage charging for energy storage. In this circuit, the comparator 11 compares the voltage developed across the capacitor C with full charge voltage Vrf. If the voltage across the capacitor C reaches Vrf, the comparator 11 produces a signal Sg indicative of full charge. In response to this signal, the mode of operation is switched to constant-voltage charging, in the same way as in the embodiment described previously in connection with FIG. 1. In the embodiment illustrated in FIG. 5, a diode D connected in parallel with the capacitor C acts to prevent reverse current.

Figure 6:
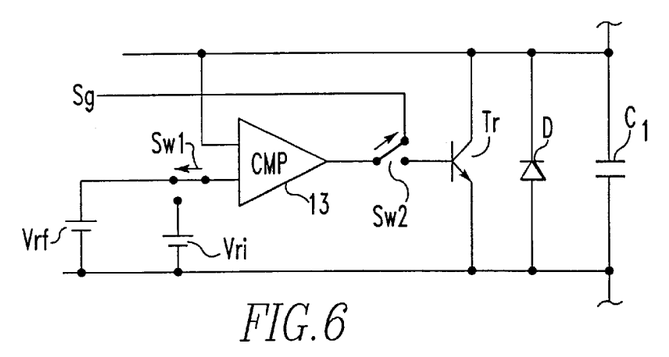
FIG. 6 is a circuit diagram of yet another electrical storage capacitor system in accordance with the present invention.

FIG. 6 shows a further embodiment of an electrical storage capacitor system in accordance with the present invention. In FIG. 6, a comparator 13 performs the same functions as the comparators 11 and 12 shown in FIG. 5. Switches Sw1 and Sw2 are provided to switch between initializing charging and storage charging for energy storage. The switch Sw1 selectively supplies the full charge voltage Vrf and the initialization voltage Vri to the reference signal input terminal of the comparator 13. The switch Sw2 supplies the output from the comparator 13 to a bypass transistor Tr. During storage charging for energy storage, the output is supplied to the charger 1 via an OR circuit (not shown) similar to the OR circuit 2 shown in FIG. 1 or 4.

In the illustrated positions of the switches Sw1 and Sw2, storage charging for energy storage is done. Under this condition, the comparator 13 compares the voltage developed across the capacitor C with full charge voltage Vrf. If the capacitor C is charged to the full charge voltage Vrf, the comparator sends out an ON signal Sg indicative of full charge.

When initializing charging is performed, the switches Sw1 and Sw2 are thrown to their other sides. Under this condition, the comparator 13 compares the voltage developed across the capacitor C with the initialization voltage Vri. If the capacitor C is charged to the initialization voltage Vri, the comparator produces an ON signal and sends it to the transistor Tr. As a result, the transistor Tr is turned on, thus bypassing the charging current.

As already described, once the system has been initialized, the voltage is divided among the capacitors normally in a given ratio according to the capacitance of the individual capacitors, even if the capacitors are charged and discharged with varying levels of current. However, changes in capacitance of the individual capacitors with the passage of time, or differences of leakage current of the individual capacitors, cause the terminal voltages of the capacitors to differ. If such differences of the terminal voltage cannot be neglected, it is necessary to perform initializing charging to resume the original voltage proportion ratio.

Figure 7A:
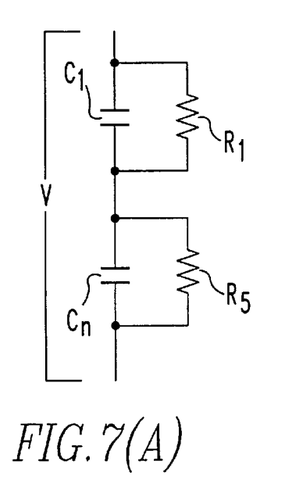
FIG. 7(A) is an equivalent circuit diagram of capacitors connected in series.

As shown in FIG. 7(A), it is assumed that the capacitors $C_1, \ldots, C_n$ connected in series have leakage resistances $R_1, \ldots, R_n$, respectively. The voltage $V_x$ allotted to an arbitrary capacitor $C_x$ can be calculated as follows. After a lapse of a time that is sufficiently longer than the time constant determined by the capacitance and the leakage resistance, the allotted voltage is given by $$V_{XR} = \left\{ \frac{R_X}{(R_1 + \Lambda + R_n)} \right\} V \quad (1)$$

The allotted voltage, immediately after charging by a current source in a time sufficiently shorter than the time constant, is given by $$V_{XC} = \frac{(1/C_x)V}{\{(1/C_1) + \Lambda + (1/C_n)\}} \quad (2)$$

Eqs. (1) and (2) are superimposed according to the Thévenin's theorem. The maximum allowable value of the voltage $V_x$ allotted to the capacitor during a sufficiently long time is the maximum value of Eq. (3) below.

$$V_x = V_{XR} + V_{XC} \quad (3)$$

This result means that the voltage allotted to the capacitor can vary within a range proportional to the sum of the variation in the capacitance and the variation in the leakage resistance. If the capacitor has a minimum capacitance and exhibits a minimum leakage current, this device bears a maximum voltage. Whatever kind of initializing operation is performed, it is impossible to make uniform the amplitudes of voltages produced by charging and discharging due to differences in capacitance, it being noted that the voltages are given by Eq. (2).

However, if an initializing operation is effected, the allotted voltage (given by Eq. (1)) due to a leakage current can be made equal to the value (given by Eq. (2)) assumed immediately after charging, for every capacitor.

Normally, it is relatively easy to manage errors of the capacitances of electric double-layer capacitors within a given range (e.g., ±10%) in industrial fabrications. However, it is difficult to suppress leakage currents within small errors. Furthermore, where the environment in which the system is used, the temperature, and aging characteristics within the operating life are also taken into consideration, it is quite difficult to manage leakage currents within ±10%. Accordingly, the initializing operation according to the present invention suppresses voltage allotment given by Eq. (1). This yields great practical advantages.

Figure 7B:
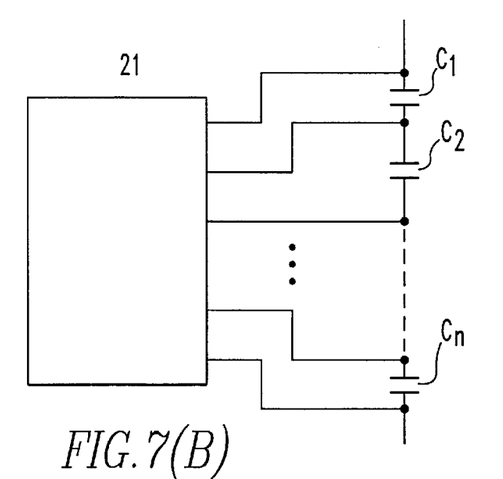
FIG. 7(B) is a diagram of a circuit for detecting the voltages developed across capacitors.

In order to carry out initializing operation and storage charging for energy storage in accordance with the present invention, it is necessary to monitor the voltages across numerous capacitors connected in series. They must be controlled according to the monitored voltages. This can be done using a voltage monitor device 21 that takes the voltages at the junctions of the capacitors $C_1, C_n$ as shown FIG. 7(B). The voltage monitor device 21 can be made of one or more comparators or consist of a microprocessor having an A/D converter. Since the charging time of a large-sized electrical storage capacitor system is as long as tens of seconds or longer, it is possible to monitor the voltages developed across numerous capacitors with a simple device. The charging is controlled according to the result. If trouble occurs, short-circuiting is performed or other control is provided.

During initializing charging, if the voltage monitor device senses that the total voltage of the voltages developed across the capacitors connected in series becomes equal to "initialization voltage Vri×number of capacitors n", then it is possible to judge that the initializing charging is complete. Furthermore, completion of the initializing charging can be judged by monitoring the total voltage and sensing that the voltage has settled itself in a given value.

A decision as to whether initializing charging is necessary or not can be made by observing the total voltage when storage charging is finished. For example, at the first storage charging immediately after an initializing operation, the total voltage at which the first capacitor has become full charge and the storage charging has finished is stored in memory. After the first storage charging, discharging and storage charging are done repeatedly. The stored total voltage is compared with total voltages when the subsequent storage chargings are finished. If the difference is great, then it can be judged that initializing charging is necessary. If the total voltage when storage charging is finished drops, then an initializing operation may be performed prior to the next storage charging.

It is to be understood that the invention is not limited to the embodiments described above and that various changes and modifications are possible. For instance, initializing charging may be done at regular intervals.

As can be understood from the description provided thus far, the present invention provides an electrical storage capacitor system for charging capacitors connected in series, the capacitor system comprising voltage detection means, voltage-limiting means, initializing charging means, and storage charging means. The voltage detection means sense that voltages developed across the capacitors are coincident with a first reference value. The voltage-limiting means limit the voltages developed across the capacitors to a second reference value. During initializing charging, the initializing charging means operate the voltage-limiting means and perform initializing charging. The storage charging means charge the capacitors connected in series to store electric energy. During storage charging, the storage charging means perform full charging according to output signals from the voltage detection means until any one of the capacitors reaches the first reference value. Therefore, during initializing charging, energy loss is reduced greatly. Generation of heat can be prevented. Storage charging for energy storage is ended when the voltage of any one of the capacitors first reaches full charge voltage. Consequently, during storage charging, too, energy loss can be reduced.

Figure 12:
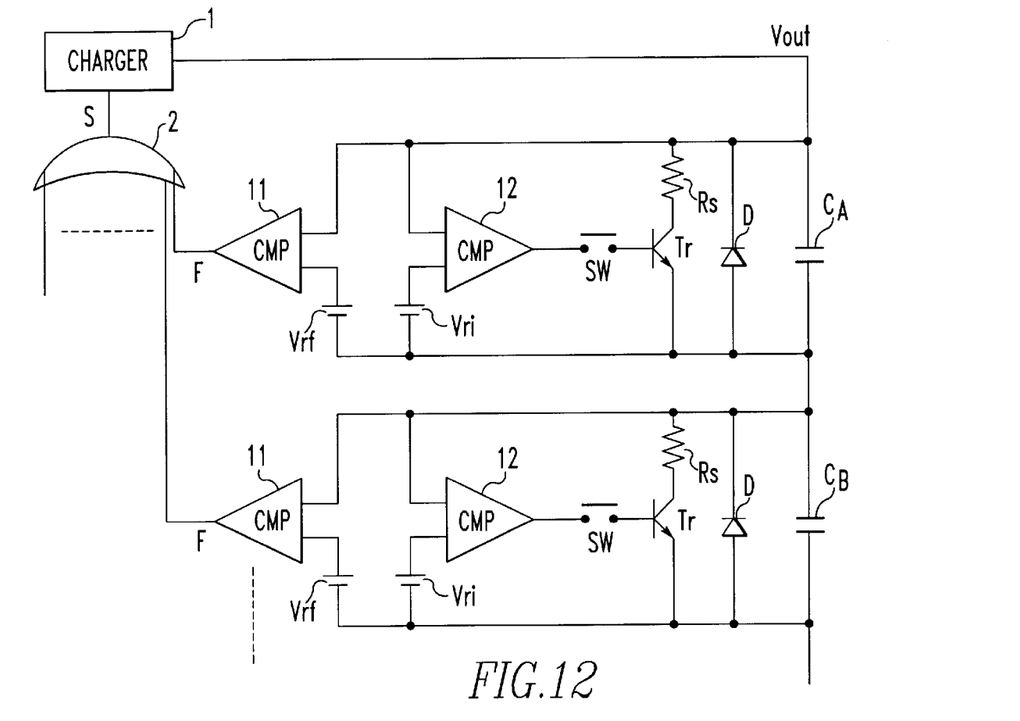
FIG. 12 is a circuit diagram of a further electrical storage capacitor system in accordance with the present invention.

FIG. 12 shows a further electrical storage capacitor system in accordance with the present invention. This storage capacitor system is similar to the system described above in connection with FIG. 5, except that a current-limiting resistor Rs is inserted in the collector circuit of the bypassing transistor Tr.

Referring still to FIG. 12, a reference voltage Vrf is set to the full charge voltage of the capacitor, and another reference voltage Vri is set lower than the reference voltage Vrf, in the same way as in the embodiment of FIG. 5. After the switch SW is closed, i.e., during initial charging, comparators CMP are turned on one after another when their capacitors are charged up to the reference voltage Vri. Thus, the transistors Tr are turned on one after another. As a result, a bypass circuit consisting of the transistor and the resistor Rs is formed for each charged-up capacitor, thus bypassing a part of the charging current.

The charging/discharging characteristics of the embodiment of FIG. 12 are described below by referring to FIG. 13. It is assumed that capacitors $C_A$, $C_B$, etc., are fully discharged at time to and that they are started to be charged with a constant current. When the initialization switch SW is open, even if the voltage developed across a capacitor exceeds the reference voltage Vri, a bypass circuit for the charging current is not formed. Therefore, as indicated by straight lines A and B near the left end of FIG. 13, the voltages rise at gradients according to the capacitances of the capacitors $C_A$, $C_B$, etc. If the terminal voltage of any one of the capacitors $C_A$, $C_B$, etc. (e.g., the capacitor $C_A$ having a smaller capacitance) reaches the reference voltage Vrf at time $t_1$, an output signal F from comparator 11 indicating full charging goes high and so the output signal S from the OR gate 2 goes high. In response to this output signal S, the charger 1 stops the constant-current charging and makes a transition to constant-voltage charging.

Under this constant-voltage charging, if the terminal voltage of the capacitor $C_A$ drops below the reference voltage Vrf due to self-charging inside the capacitor or self-discharging, the signals F and S go low. Therefore, charging is resumed. As a result, the terminal voltage of each capacitor is maintained at a constant voltage after time $t_1$, and relaxation charging continues.

After the relaxation charging is conducted for an appropriate period of time, electric power stored by the charging is supplied to the load during a period between times $t_2$ and $t_3$. As this charging process progresses, the terminal voltage of each capacitor gradually drops. It is now assumed that the terminal voltage of each capacitor has dropped to some extent at time $t_3$ and that the initialization switch SW is closed at this time to start charging in the initializing mode.

We now assume that the terminal voltage of any capacitor reaches the full charge voltage Vrf at or after time $t_3$ and that the switch SW is kept closed until the stopping signal S goes high at time $t_6$. The period between times $t_3$ and $t_6$ is referred to as the initial setting period. During this initializing period, as the charging progresses, the terminal voltage of each capacitor rises. First, the terminal voltage of the capacitor $C_A$ reaches the reference voltage Vri at time $t_4$. At this time, the bypass circuit for the capacitor $C_A$ is turned on. Belatedly, the bypass circuit for the capacitor $C_B$ is turned on at time $t_5$.

When the bypass circuits ancillary to the capacitors are turned on, the rate at which the terminal voltage of each capacitor rises is reduced by an amount corresponding to the current flowing through the bypass circuit. If the resistor Rs inserted in series with the transistor Tr is zero as in the embodiment of FIG. 5, the terminal voltage cannot exceed the reference voltage Vri.

In the present embodiment, the value of the resistor Rs is selected so that half, for example, of the charging current is bypassed. Therefore, the rate at which the terminal voltage rises is halved compared with the case in which the bypass circuit is not yet turned on. However, the terminal voltage continues to rise slowly. When the terminal voltage of the capacitor $C_A$ reaches the reference voltage Vrf at time $t_6$, comparator 11 produces the stopping signal S, thus ending the initializing charging.

Figure 13:
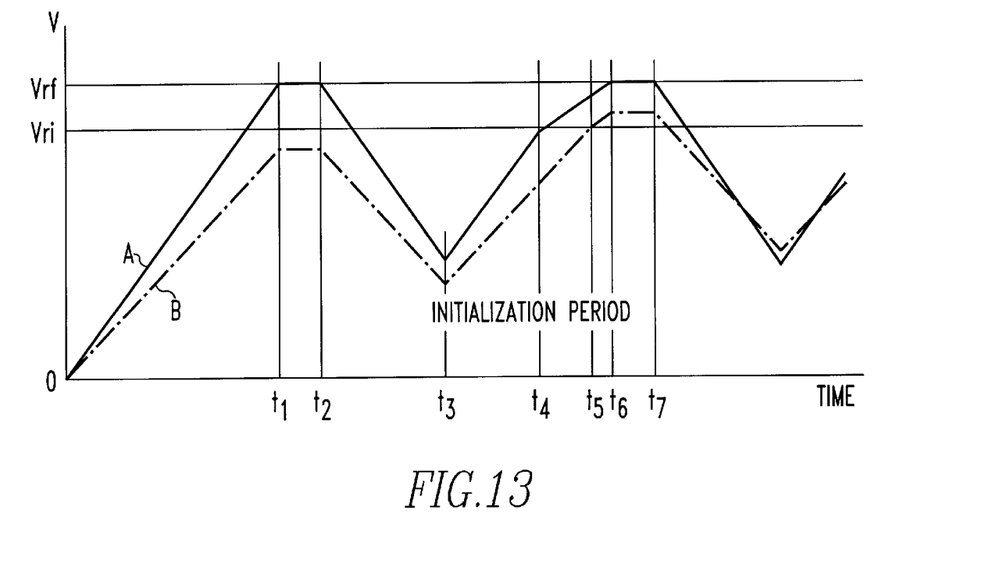
FIG. 13 is a graph illustrating the charging/discharging characteristics of the electrical storage capacitor system shown in FIG. 12 when and after storage charging and initializing charging are done.

As shown in FIG. 13, as soon as the terminal voltage of the capacitor $C_A$ reaches the reference voltage Vri at time $t_4$, the bypass circuit operates. The capacitor $C_B$ belatedly reaches the reference voltage Vri at time $t_5$; the bypass circuit does not operate even after time $t_4$ but starts to operate at time $t_5$. That is, during the period between times $t_4$ and $t_5$, the terminal voltage of the capacitor $C_A$, whose bypass circuit is in operation, rises at a decreased rate. On the other hand, the terminal voltage of the capacitor $C_B$ whose bypass circuit is not in operation increases at a high rate. The difference in terminal voltage between both capacitors was V4 at time $t_4$. At time $t_5$ when the bypass circuit for the capacitor $C_B$ starts to operate, the difference decreases to V5.

Comparison of the terminal voltages of the capacitors at times $t_1$ and $t_6$ reveals that the terminal voltage of the capacitor $C_B$ at the end of charging is increased close to the terminal voltage of the capacitor $C_A$.

In the initializing mode in accordance with the present embodiment, the terminal voltages of the capacitors are not made exactly uniform. That is, complete initialization is not accomplished. However, once charging is done in the initializing mode, the variations among the terminal voltages of the capacitors are lessened.

If charging is repeated in this initializing mode, the variations among the terminal voltages of the capacitors are reduced gradually. By repeating the charging process a sufficient number of times, the terminal voltages of the capacitors can be made substantially uniform. That is, in the present embodiment, the initializing operation can be done by repeating charging and discharging under normal usage conditions. Hence, any special initializing cycles as used in other embodiments are not necessary.

It is necessary to take account of two conditions in designing the capacitor system in accordance with the present embodiment. The first condition is the difference between the reference voltages Vrf and Vri. Since the reference voltage Vrf is determined by the rated voltage (full charge voltage) of each capacitor, it can be said that a choice is only the value of the reference voltage Vri. If the value of the reference voltage Vri is set higher and closer to the reference voltage Vrf, the bypass circuit for the capacitor operates for a shorter time and the amount of compensation for averaging out the terminal voltages of the capacitors per charging process is small. Conversely, if the reference voltage Vri is reduced, the bypass circuit for the capacitor operates for a longer time.

Therefore, for the same bypass circuit, the amount of compensation per charging process is increased. However, if the reference voltage Vri is set lower, the amount of electric power bypassed is increased. This increases the amount of heat generated by the bypass circuit and the amount of wasted power in initializing the capacitor system.

The second condition is the amount of bypassed current, i.e., the ratio at which the charging current is bypassed. This ratio is determined by the resistance Rs. If the reference voltage Vri is set high and the resistance Rs is set low to increase the bypass current, a large amount of bypass current flows only around the top of the charging curve. The time for which the charging current is bypassed is shortened. However, the amount of electric power wasted for the initializing process increases in proportion to the square of the voltage. This increases the loss consequent upon initialization. Furthermore, it is necessary to design the bypass circuit to have a rating sufficient to withstand the increased current.

On the other hand, if the resistance Rs is set low and the bypass current is reduced, the rate at which the terminal voltage rises during operation of the bypass circuit is not reduced sufficiently. Therefore, the amount of compensation for the variations of the terminal voltages per charging process decreases.

Accordingly, it is necessary to appropriately set the difference between the reference voltages Vrf and Vri and the value of the bypass current, taking account of various factors, e.g., the degree of variations of the capacitances among the capacitors, the operation time of each bypass circuit (that may be limited by the amount of heat generated), the period of the initializing operation, and the number of charging processes allowed for initialization. In addition, the conditions under which the initializing mode is activated and deactivated may be set at will.

There are two kinds of conditions to start initialization. The first condition is the absolute condition to avoid the breakdown or stoppage of the system. For example, when the total voltage Vout of the capacitors at the end of charging is lower than a threshold value, the initializing mode is activated.

The other condition is the mandatory condition to intentionally start initialization as occasion demands. For example, in the case of a hybrid vehicle, the mandatory condition is the time when the vehicle is about to start (in preparation for driving the vehicle). In the case of storage of electric power, an example of the mandatory conditions is the time before the peak time of power consumption in summer, i.e., in the morning. In this way, the mandatory conditions for initialization may be set according to requirements complying with applications and according to the results of operation forecasts.

The initializing mode is deactivated when conditions (referred to as initialization halt conditions) that urge halt of the operation occur or when an initializing operation is completed (referred to as initialization end conditions). In the case of a hybrid vehicle, the initialization halt conditions are set, depending on the requirements complying with applications as encountered during regenerative braking, or on the results of operation forecasts.

The initialization end conditions occur when (1) a given time passes since an initializing operation has been started, (2) the total voltage Vout of the capacitors has increased by a given value after an initializing operation has been started, (3) the total voltage Vout reaches a given value or (4) the temperature of the heat-dissipating plate of any parallel monitor exceeds a tolerable range. By using selected ones of these conditions, it is possible to prevent the initializing operation from persisting for a long time.

Figure 14:
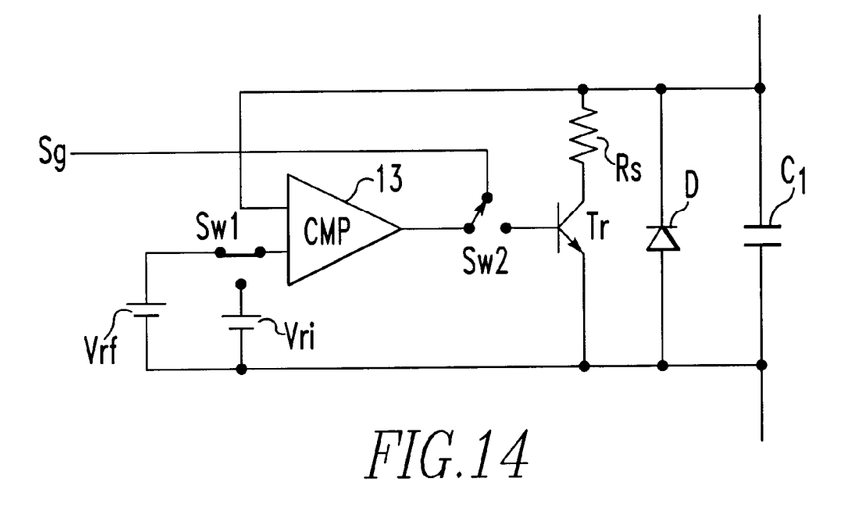
FIG. 14 is a circuit diagram of a further electrical storage capacitor system in accordance with the present invention.

FIG. 14 shows a further electrical storage capacitor system in accordance with the present invention. This storage capacitor system is similar to the system described already in connection with FIG. 6, except that a current-limiting resistor Rs is inserted in the collector circuit of the bypassing transistor Tr.

In this embodiment, the same charging/discharging characteristics as the embodiment shown in FIG. 12 can be obtained by the presence of the current-limiting resistor Rs inserted in the collector circuit of the bypass transistor Tr.

Having thus described our invention with the detail and particularity required by the Patent Laws, what is desired protected by Letters Patent is set forth in the following claims.

What is claimed is:

1. An electrical storage capacitor system for charging plural capacitors connected in series, said electrical storage capacitor system comprising:

first voltage detection means for sensing that voltages developed across said capacitors are coincident with a first reference voltage;

second voltage detection means for sensing that voltages developed across said capacitors are coincident with a second reference voltage;

current bypass means for bypassing a part of the charging current around said capacitors according to outputs from said second voltage detection means;

initializing charging means for performing initializing charging while causing said second voltage detection means and said current bypass means to control said capacitors; and storage charging means for charging said capacitors connected in series to store electric energy in said capacitors, said storage charging means performing storage charging for energy storage according to output signals from said voltage detection means until the voltage of any one of said capacitors reaches said first reference voltage.

2. The electrical storage capacitor system of claim 1, wherein said first reference value is a full charge voltage, and wherein said second reference voltage is lower than said full charge voltage.

3. The electrical storage capacitor system of claim 2, wherein said second reference voltage is identical in polarity to said full charge voltage, and wherein said initializing charging means apply to said capacitors a voltage identical in polarity to a voltage used during storage charging.

4. The electrical storage capacitor system of claim 3, wherein said first voltage detection means include comparators for comparing the voltages developed across said capacitors with the first reference value.

5. The electrical storage capacitor system of claim 4, wherein said first voltage detection means and said second voltage detection means share the same comparators, and wherein there is further provided switching means for selectively supplying said first and second reference values to reference input terminals of said comparators.

6. The electrical storage capacitor system of any one of claims 1–5, wherein said storage charging means perform storage charging with a current source, and wherein, when any one of the voltages developed across the capacitors reaches said first reference value, the charging is switched to constant-voltage charging.

7. The electrical storage capacitor system of claim 1, further comprising means for detecting decreases in the voltages developed across the capacitors when said first reference value is reached, whereafter storage charging by said storage charging means is repeated.

8. The electrical storage capacitor system of claim 1, further comprising means for detecting increases in variations among the voltages developed across said capacitors when said first reference value is reached, whereafter storage charging by said storage charging means is repeated.

* * * * *

UNITED STATES PATENT AND TRADEMARK OFFICE
CERTIFICATE OF CORRECTION

PATENT NO.    : 6,225,781 B1
DATED         : May 1, 2001
INVENTOR(S)   : Michio Okamura et al.

It is certified that error appears in the above-identified patent and that said Letters Patent is hereby corrected as shown below:

Column 3,
Line 32, "power supply if" should read -- power supply $1f$ --.

Column 5,
Line 53, "power supply if" should read -- power supply $1f$ --.
Line 56, "power supply if" should read -- power supply $1f$ --.

Column 9,
Line 36, "time to" should read -- time $t_0$ --.

Signed and Sealed this

Thirteenth Day of November, 2001

*Attest:*

NICHOLAS P. GODICI
*Attesting Officer*     *Acting Director of the United States Patent and Trademark Office*